United States Patent Office 3,398,668
Patented Aug. 27, 1968

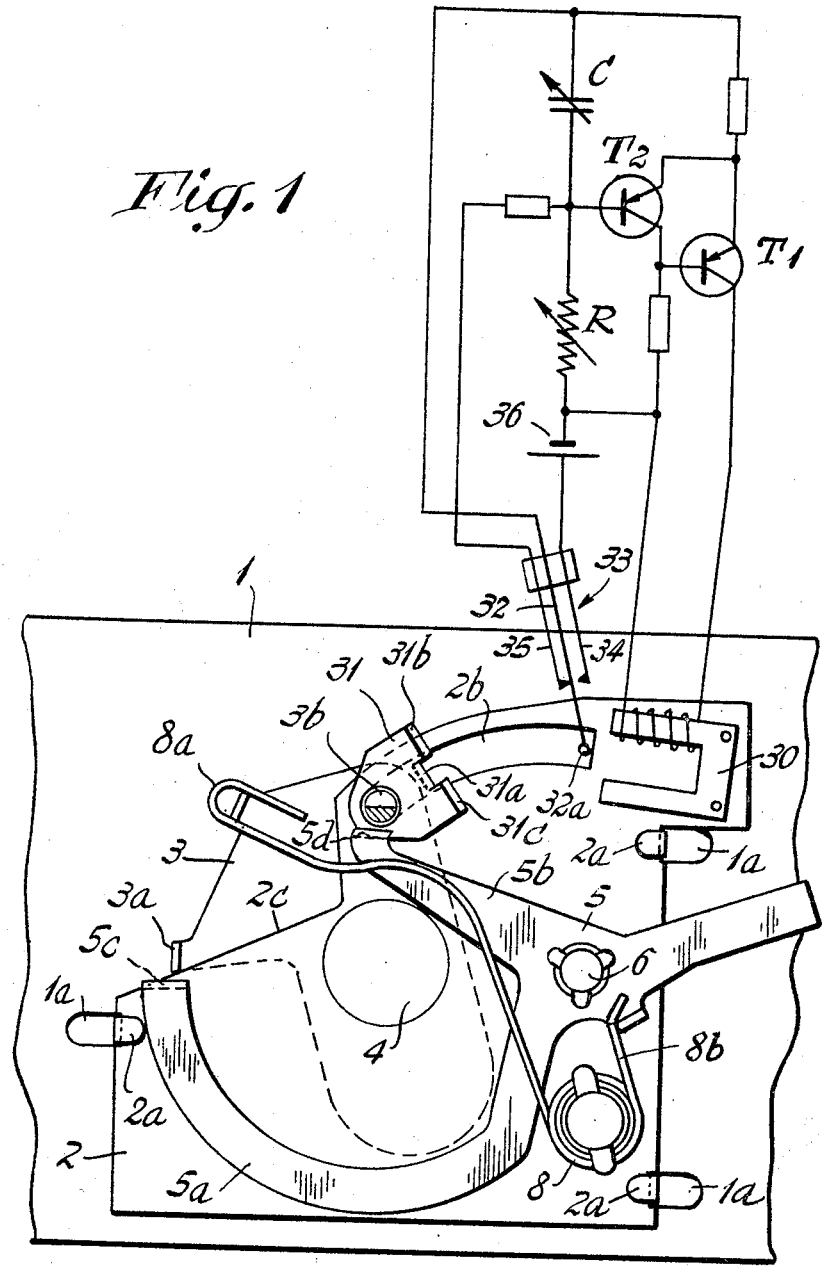

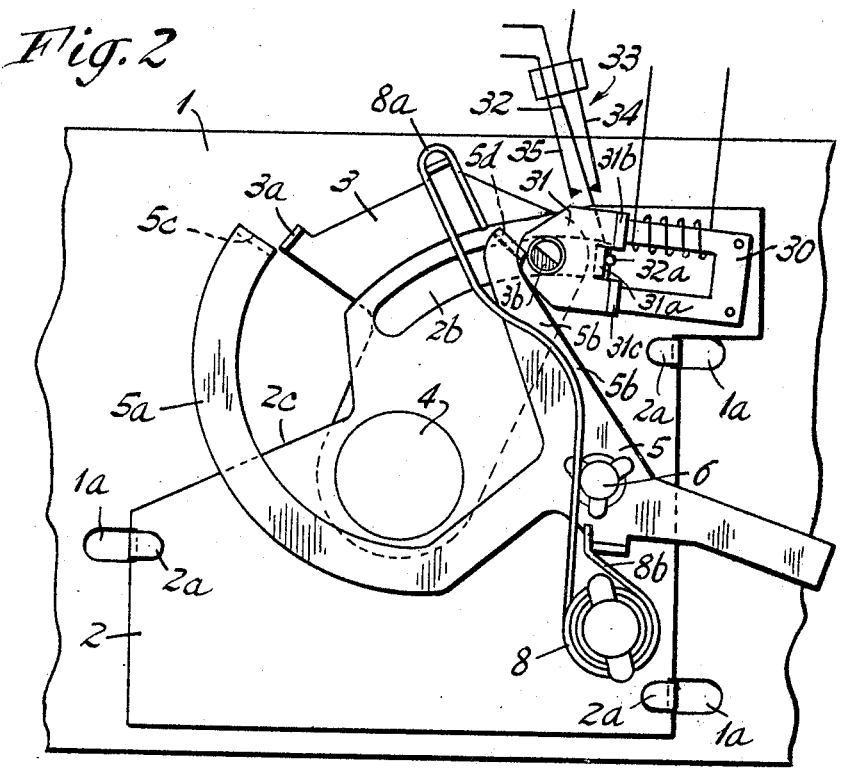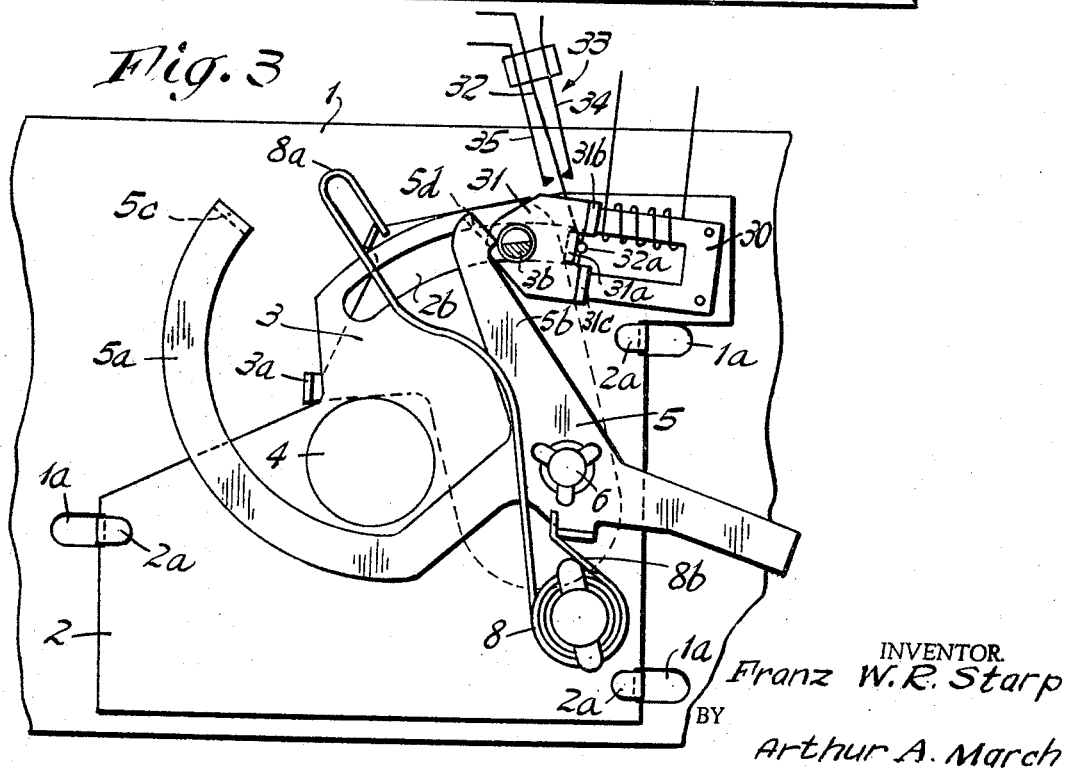

3,398,668
AUTOMATIC PHOTOGRAPHIC SHUTTER
Franz W. R. Starp, Calmbach, Black Forest, Germany, assignor to Prontor-Werk Alfred Gauthier, G.m.b.H., Calmbach, Black Forest, Germany, a corporation of Germany
Filed Oct. 22, 1965, Ser. No. 501,947
Claims priority, application Germany, Oct. 23, 1964, G 41,844
7 Claims. (Cl. 95—53)

ABSTRACT OF THE DISCLOSURE

An automatic shutter having a lens aperture and a single shutter blade. A spring is provided to act upon the shutter blade during the opening and closing of the lens aperture. A driving mechanism sets the spring and automatically releases the shutter blade for reaching the cocked position. In addition, an electronic timing circuit is provided which becomes actuated when the shutter blade reaches the cocked position. The electronic circuit retains the shutter blade in a position corresponding to opening of the lens aperture for an interval corresponding to the exposure time.

---

This invention relates to an automatic photographic shutter of variable exposure times, employing an electronic timer in conjunction with a simplified mechanism derived from shutters of constant exposure times.

Heretofore, shutters having relatively few structural members have been known. An especially simplified design developed by this same inventor consists of only a single spring-driven shutter blade actuated by a manually operable driving mechanism, which automatically releases the blade for opening and closing of the lens aperture after the blade has been moved into its cocked position. Accordingly, a shutter of this type has only three movable structural elements—a shutter blade, a cocking and release lever, and a driving spring. In principle, the cocking and release lever has lugs that cooperate with drivers or driving members arranged on the shutter blade. One of the drivers is positively guided in a slot while the other driver is freely and movably held on a supporting edge. The driving spring serves to drive the shutter as well as cause the return of the cocking and release lever. Through this particular technique of positioning and guiding the shutter blade, the lens aperture remains fully covered during the cocking process. However, this simplified and dependable shutter actuating mechanism provides only one and constant exposure time.

It is an object of this invention therefore, to provide an automatic photographic shutter capable of exposure times variable over a wide range, and retaining the features of the aforementioned simplified shutter actuating mechanism. In order to achieve this object, the present invention provides an electronic timing circuit which imposes a desired exposure time to the simplified shutter actuating mechanism, by controlling the current flow through an electromagnet. A magnetizable armature moves with the shutter and engages the poles of the electromagnet, when the shutter blade is moved into the cocked position. At this position the armature also actuates a contact switch which activates the electronic timing circuit and connects the circuit output to the electromagnet. Through this arrangement it is possible to combine a simple shutter actuating mechanism with an equally simple timing circuit to obtain a wide selection of exposure times.

It is another object of this invention to provide a shutter actuating mechanism in which the armature is carried by the slot-guided driver, and operates an electrical switching device on its path towards the cocked position. The electrical switch serves to control the energizing and de-energizing of the electromagnet. Through this arrangement of the mechanism, a minimum number of parts are required, and manufacturing and assembly costs are at their lowest possible values.

A still further object of this invention is to provide the armature with a lug which moves along the guiding slot and depresses the contact spring of the switching device upon reaching the cocked position at which the armature commences to adhere to the poles of the electromagnet. This design activates dependably the electronic timing circuit at the proper instant when operating the photographic shutter.

The invention will be described in greater detail in connection with the following drawings which illustrate the embodiments of the invention in which:

FIGURE 1 shows the electronic timing circuit in conjunction with the automatic shutter when the cocking and release lever is in its starting position.

FIGURE 2 shows the shutter of FIGURE 1 at the end of the cocking motion during the cocking and release process, when the shutter blade still covers the lens aperture and the switch which activates the timing circuit, has just been actuated.

FIGURE 3 shows the shutter blade disengaged from the cocking and release lever, and being held by the electromagnet, in the position which uncovers the lens aperture.

In accordance with FIGURES 1 to 3, the shutter includes a cover plate 1, which may be formed, if desired, as part of the front wall of the camera housing. On the inside of the cover plate is a base plate 2 that carries the movable members of the shutter. Clamping projections 1a and 2a may be located so that they can be brought into engagement when mounting the base plate 2. The projections 1a and 2a are preferably formed to leave a gap between the cover plate 1 and the base plate 2 within which an L-shaped shutter blade 3 is free to move. Both the cover plate 1 and the base plate 2 are provided with a lens aperture 4, which is closed by the shutter blade 3 when the latter is in its starting position.

The base plate 2 has an arcuate slot 2b and a straight-sliding and supporting edge 2c extending in approximately the same direction as the slot 2b. The slot 2b and the edge 2c are provided for the purpose of positioning and guiding the shutter blade 3, which has a driver in the form of a pivot pin 3b extending into the slot 2b and a laterally bent-off driver or driving member 3a that engages the edge 2c.

A cocking and release lever 5 is provided for actuating the shutter blade 3, which is both rotated in the slot 2b and displaceable guided therealong. The lever 5 may be fork-shaped, as illustrated in the drawing, and may be rotatably mounted on a pivot pin 6 molded to the base plate 2. The lever 5 has arms 5a and 5b which are guided on both sides of the lens aperture 4 and which have, at their ends, bent-off lugs 5c and 5d that cooperate with the driving lug 3a and with the pivot pin 3b. The driving lug 3a on the shutter blade may be in the form of a laterally bent-off lug, but the pivot pin 3b preferably has a circular cross-section for the portion within the slot 2b and a semi-circular cross-section at its outer end to engage with the lug 5d.

A driving spring 8 is provided to store, during the cocking process, the necessary cocking moment to actuate the shutter blade 3. This spring is in the form of a coil spring having one end 8a which engages a lug on the shutter blade 3, and another end 8b which bears against the bent-off lug on the cocking and release lever 5.

When operating the shutter mechanism without the timing circuit, made possible through removal of the electrical or battery supply to the circuit, a single and constant exposure time is obtained in the following manner.

When the camera release member is actuated, the cocking and release lever 5 rotates clock-wise about the bearing pin 6. This rotary motion causes the lugs 5c and 5d to engage the driving lug 3a and the pivot pin 3b, respectively, thereby moving the shutter blade 3 from the position of FIGURE 1 into an intermediate position shown in FIGURE 2 while simultaneously increasing the tension of the driving spring 8. The shutter blade 3 continues to cover the lens aperture during this movement, and at the end of the movement, the driving lug 3a automatically becomes disengaged from the lug 5c because of the fact that the driving member moves along a slightly different path from that followed by the lug 5c. As a result, the shutter blade 3 is first rotated counter-clockwise about the pivot pin 3b because of the force of the driving spring 8, thus uncovering lens aperture 4. Thus rotary motion is completed as soon as the driving member 3a strikes the edge 2c, and at the same time the semi-circular portion of the pivot pin 3b rotates to a relative position with respect to the lug 5d such that the pin is able to slide past the lug, as shown in FIGURE 3. The spring 8 is still under considerable tension, but the entire shutter blade 3 is now free to be moved rapidly to the left by the spring. During this motion, the driving member 3a move along the sliding and supporting edge 2c, and the pivot pin 3b moves in the slot 2b until the pin reaches the other end of the slot, which places the shutter blade 3 directly across the aperture 4 and in the same position shown in FIGURE 1. Accordingly, when operated in this manner, the shutter mechanism will provide only a single and constant exposure time.

In order to obtain photographs with exposure times of different duration, the shutter is associated with an electronic timing circuit which serves to control an electromagnet 30. The latter may be arranged on the base plate 2 and may cooperate with an armature 31 coupled to the shutter blade 3. The armature 31 may be positioned on the pin 3b of the shutter blade 3, to obtain the most simplified construction. The armature 31 includes a lug 31a which engages the slot 2b for the purpose of guiding the armature. Moreover, the armature 31 is provided with two magnetizable surfaces 31b and 31c which can be brought into engagement with the poles of the electromagnet 30. Surfaces 31b and 31c of the armature, adhere to the poles of the electromagnet, and hold the shutter blade 3 in the position shown in FIGURE 2, when the electromagnet is energized at the end of the cocking process.

Located in slot 2b in the vicinity of the electromagnet 30, is the end 32a of a contact spring 32 which is provided with an insulating member. The contact spring 32, in turn, is a component of a switch 33 provided for connecting and disconnecting the electronic timing circuit. In addition to the contact spring 32, the switch 33 also includes the contacts 34 and 35. The position of the end 32a of the contact spring 32, with respect to the armature 31, is such that the end 32a can be depressed by the lug 31a. This depressing action causes contact spring 32 to bear against contact 34, shortly before the shuter blade 3 and armature 31 have reached the intermediate position shown in FIGURE 2.

The monostable multivibrator circuit shown in the drawing is essentially a delay circuit composed of a variable resistor R, variable capacitor C, transistors $T_1$ and $T_2$, and an electrical power supply 36. The resistor and capacitor combination form the time constant RC of the circuit. This time constant or delay corresponds to the exposure time of the lens aperture. Transistor $T_1$ is connected in the circuit such that the engagement of contact 32 with contact 34 closes the circuit of this transistor to the power supply. In this manner switch 33 controls the state of transistor $T_1$ which energizes electromagnet 30 during its conducting period. Additional biasing resistors not shown in the wiring diagram, serve to complete the circuit.

The operation of the shutter mechanism in conjunction with the electronic timing circuit is as follows:

If the camera release member (not shown in the drawing) is actuated, the cocking and release lever 5 executes a clockwise rotary motion about the bearing pin 6. The lugs 5c and 5d of the cocking and release lever thereby engage respectively the lug 3a and the pin 3b of the shutter blade 3. This causes the shutter blade to be transferred from the position illustrated in FIGURE 1 to the intermediate position shown in FIGURE 2, thereby increasing at the same time, the tension in driving spring 8. In the final phase of the cocking motion of the lever 5, the lug 5c is automatically removed from engagement with the driving lug 3a, and the lug 31a impinges on the end 32a of the contact spring 32. The pressure of end 32a causes contact spring 32 to bear against contact 34, at approximately the same instant that surfaces 31b and 31c engage the poles of the electromagnet 30. After the lug 5c has slid off the lug 3a, the shutter blade 3 is first rotated due to the action of the driving spring 8, in counter-clockwise direction about the pin 3b. The motion, in turn, releases the lens aperture, as shown in FIGURE 3.

When contact spring 32 engages contact 34 during the final phase of the cocking motion, transistor $T_1$ is connected to the power supply while transistor $T_2$ is blocked. At the same time capacitor C begins charging. The flow of current through the transistor $T_1$ energizes the electromagnet 30 which, in turn, attracts the armature 31, thereby preventing the shutter blade 3 from executing a return motion by holding the driver 3b in the intermediate position shown in FIGURE 3. When the shutter blade 3 has executed a rotary motion about the driver 3b, to the extent that it has opened the lens aperture, lug 3a impinges on the sliding and supporting edge 2c. With this configuration the projecting, semicircular portion of the pin 3b loses its support on the lug 5d, but the pin as well as the shutter blade 3 retain their position until the electromagnet 30 becomes de-energized. This occurs when the capacitor C is charged to such a degree that the transistor $T_2$ connected thereto begins to conduct. At that moment, the current through transistor $T_2$ increases rapidly owing to the regenerative feed back of the two transistors $T_1$ and $T_2$, while the transistor $T_1$ ceases to conduct. This produces the result that current ceases to flow through the electromagnet 30, causing the magnetic field to collapse thereby releasing armature 31 from the poles of the magnet.

Due to the cocked driving spring 8, the shutter blade 3 is acted upon and forced to return to its initial position shown in FIGURE 1. During this return motion of the shutter blade, driver 3a slides along the supporting edge 2c, and pin 3b moves in the slot 2b so as to assure the proper return of the shutter. As soon as armature 31 moves away from electromagnet 30 due to the action of the driving spring 8, the contact spring 32 is removed from contact 34 and returns to its starting position, in which it engages contact 35. This causes the flow of current to the transistors $T_1$ and $T_2$ to become interrupted, and the capacitor C to become discharged.

The values of resistor R and capacitor C are adjustable or variable, and this allows the setting of the holding time of the electromagnet and hence the exposure time, by the desired amount.

When the shutter arrangement according to FIGURES 1 to 3 is provided with a device for changing the size of the lens aperture as, for example, a diaphragm, the variable capacitor C may be coupled to the diaphragm setting mechanism. This mechanism may be designed so that the film sensitivity may also be inserted into it. With this arrangement, moreover, the resistor R may be replaced with a photo-conductive cell as, for example a Cadmium Sulfide cell, and this combination makes it possible to realize automatic exposure time settings through pre-selection of the diaphragm setting mechanism.

While this invention has been described in some detail, it will be understood by those skilled in the art that variations and modifications may be made without departing from the spirit thereof or the scope of the following claims.

What is claimed is:

1. An automatic photographic shutter comprising: a lens aperture; a single spring operated shutter blade; a manually operable driving mechanism comprising a cocking and release lever having lugs thereon and a driving spring; a plurality of drivers connected to said shutter blade; a positive guide for a first one of said drivers; a supporting edge to be engaged by a second one of said drivers, said drivers engaging two of said lugs to be moved by said lever, said supporting edge cooperating with said guide in controlling the motion of said shutter blade from a closed position to an open position and back to a closed position after said lever has been moved to an actuating position; an armature coupled to said shutter blade; an electromagnet to hold in position said armature and shutter blade upon becoming energized; an electrical switching device having one contact located in the path of said armature to form a circuit closure when said armature and shutter blade have reached the cocked position; and an electronic timing circuit to energize said electromagnet upon becoming activated by said electrical switching device, said electronic circuit retaining the shutter blade in a position corresponding to opening of the lens aperture for an interval corresponding to the exposure time.

2. The automatic photographic shutter of claim 1 wherein said electronic timing circuit comprises a monostable multivibrator.

3. The automatic photographic shutter of claim 1 wherein said electronic timing circuit comprises a transistorized monostable multivibrator.

4. The automatic photographic shutter of claim 1 wherein said electronic timing circuit comprises a variable resistor, a variable capacitor, said variable resistor and capacitor to provide the time constant corresponding to the exposure time of said circuit, a power supply to serve as a current source, a first transistor to energize said electromagnet, a second transistor to control the conducting state of said first transistor by forming a monostable multivibrator circuit through cooperation with said resistor, capacitor, and power supply.

5. The automatic photographic shutter of claim 4 wherein said power supply is a portable battery.

6. The automatic photographic shutter of claim 1 wherein said armature is coupled to the first one of said drivers, and said armature actuates said switching device through a lug that engages said contact of the switching device, said lug being an integral part of said armature.

7. The automatic photographic shutter of claim 1 wherein said switching device comprises three spring contacts, the first one of said contacts extending into the path of said armature and engaging the second contact to activate said electronic circuit when the armature has reached the cocked position, said first contact engaging the third one of said contacts to return said circuit to its initial state at the end of the exposure time.

References Cited

UNITED STATES PATENTS

| | | | |
|---|---|---|---|
| 440,583 | 11/1890 | Barker | 95—59 |
| 2,999,445 | 9/1961 | Fahlenberg | 95—63 |
| 3,249,034 | 5/1966 | Burgarella | 95—53 |

JOHN M. HORAN, *Primary Examiner.*